United States Patent [19]

Jameson

[11] 4,070,834
[45] Jan. 31, 1978

[54] FLOOR-PRESSURE HOLD ANCHOR

[76] Inventor: Robert W. Jameson, 1690 Nutwood Road, Akron, Ohio 44305

[21] Appl. No.: 804,235

[22] Filed: June 7, 1977

[51] Int. Cl.² .............................................. E02D 5/74
[52] U.S. Cl. ....................................... 52/166; 52/704; 72/705; 105/475; 105/485
[58] Field of Search ................ 52/704, 707, DIG. 11, 52/705, 166, 146, 23; 24/116 R, 68 CT, 68 CD; 59/93; 248/499, 500, 119 R; 105/485, 475, 476, 480, 481, 482; 72/705

[56] References Cited
U.S. PATENT DOCUMENTS

| 2,322,576 | 6/1943 | Huebshman et al. | 248/119 R |
| 3,215,390 | 11/1965 | De Shelter | 248/119 R X |
| 3,550,343 | 12/1970 | Buske | 52/704 |
| 3,623,353 | 11/1971 | Dinerman | 52/707 X |
| 3,765,058 | 10/1973 | Scdoris | 24/116 R UX |
| 3,908,961 | 9/1975 | Hicks | 52/DIG. 11 X |

Primary Examiner—Ernest R. Purser
Attorney, Agent, or Firm—Oldham & Oldham Co.

[57] ABSTRACT

The hold down anchor is for anchoring a chain or the like and includes a metal rod having two straight arm sections forming an angle of about 90°, one arm section being adapted to be received in a socket hole in a floor or support, a reenforcing plate means secured to the second arm and dependent therefrom to rest on a floor or support when the anchor is in use, a support block having a bifurcated top portion secured to the second arm and having a top portion adapted to engage a link of a chain anchored by the hold down anchor and extending towards a load means for applying load to the hold down anchor.

5 Claims, 5 Drawing Figures

FLOOR-PRESSURE HOLD ANCHOR

BACKGROUND OF INVENTION

Heretofore there have been various types of anchor means or hold down devices provided for a variety of functions. The present device is particularly designed for use in garages or in industrial applications wherein normally a support or floor is provided and it has a hole therein for securing an anchor thereto. Then means such as chains, cables or other flexible connectors extend from the anchor device for attachment to structures such as an automobile body or frame to which a load is to be applied, for example, for straightening the same, or which connectors may have any of a number of other uses.

A number of patents have been issued on various anchor devices like that to which the present invention relates and those of which I am aware include U.S. Pat. Nos. 3,590,623; 3,550,343; 3,712,014 and 3,526,120.

Insofar as I know, none of the prior support structures, or anchors have been low in cost, uncomplicated to attach and use, and dependable in service, as well as being made sturdy for providing a long service life with a minimum of maintenance.

It is the general object of the present invention to provide an improved hold down device that is of sturdy construction and which can be readily inserted in position for anchoring one end of a load applying member, such as a chain, in place.

Another object of the invention is to provide a hold down anchor device especially adapted for use in garages or other places wherein one leg of the anchor device can be removably positioned in a support hole in a floor, and the other leg of the anchor device extends along the floor and is adapted to apply load to the support as transmitted to the anchor device from the load carrying chain or cable affixed to the anchor device.

Another object of the invention is to provide a metal anchor means which is made from a minimum of parts that normally are welded together and have a sturdy dependable construction that will provide a long service life with a minimum of maintenance.

Other objects and advantages of the invention will be made apparent as the specification proceeds.

Reference now is particularly made to the accompanying drawings, wherein.

When referring to corresponding members shown in the drawings and referred to in the specification, corresponding numerals are used to facilitate comparison therebetween.

SUBJECT MATTER OF INVENTION

The hold down anchor of the invention, as one embodiment thereof, is particularly adapted for anchoring an end of a chain that extends from such anchor at an acute angle and wherein the anchor includes a metal rod comprising two straight arm sections forming an angle of about 90° therebetween with one of the arm sections being adapted to be received in a socket hole in a floor or other support, a reenforcing member such as a plate means secured to the second arm section at spaced portions thereof and dependent therefrom to rest on the floor or support when the hold down anchor is in use; a vertically extending support block having a bifurcated top portion and with its bottom positioned over the second arm section and extending down to and engaging the plate means, and where the top portion of the support block is recessed to engage a link of the chain, an end link of which engages the one arm section so that the chain can extend from the support block to a load but with the chain being anchored by the one arm section of the rod when the anchor is in use, the recess in the upper portion of the support block having a base surface extending upwardly and outwardly from the one arm section for receiving a chain link between the spaced ends of the top portion of the support block as it extends to a load for attachment thereto.

Figure 1:
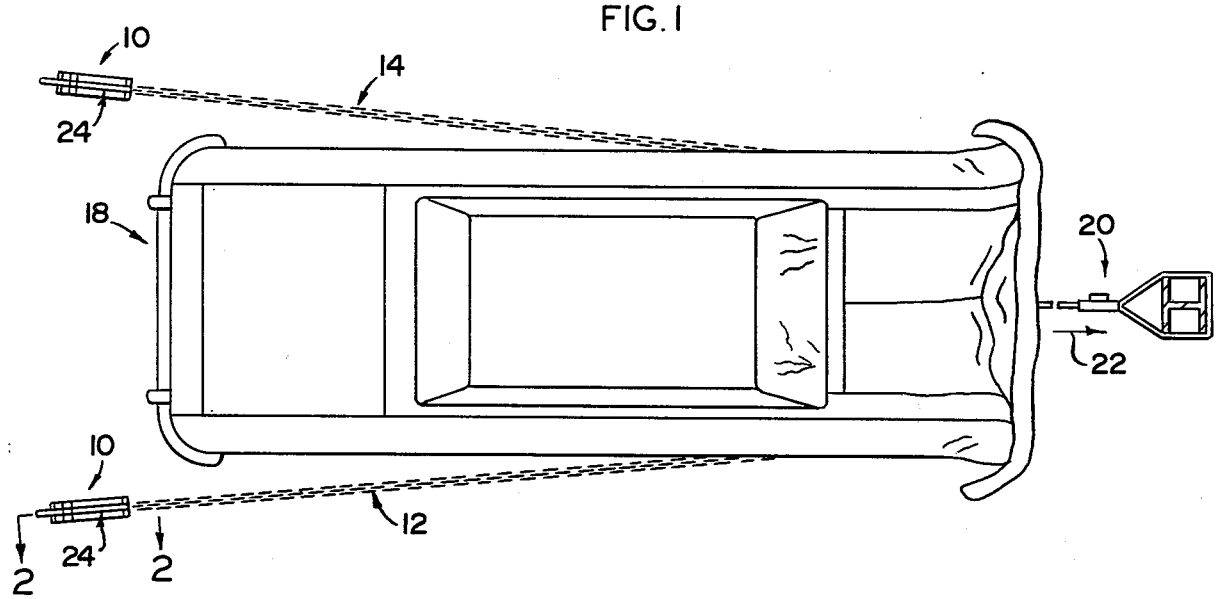
FIG. 1 is a plan of a vehicle having chain anchor means secured thereto and anchored or held down at one end by hold down anchor devices of the invention.
Figure 3:
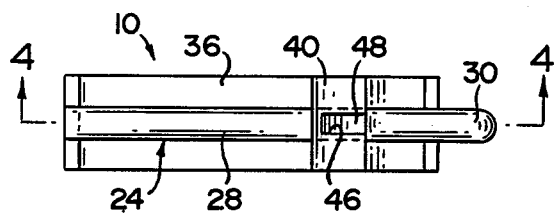
FIG. 3 is a plan view of the hold down anchor of FIG. 2.
Figure 5:
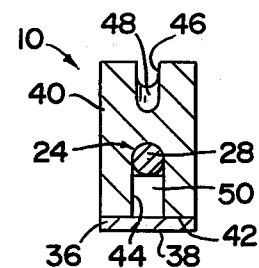
FIG. 5 is a vertical section taken on line 5—5 of FIG. 4.

A hold down anchor embodying the principles of the invention is indicated as a whole by the numeral 10. Two of these anchors 10 are indicated in FIG. 1 having ends of different chains 12 and 14 secured thereto and anchored thereby to a floor or support surface 16. These chains extend to a vehicle 18 that are attached thereto by means not shown herein. A known type of a tensioning means 20 is secured to a front portion of this vehicle 18 for applying tension thereto in the direction indicated by the arrow 22 whereby the chains 12 and 14 restrain movement of the vehicle to tension or work on the same by pressures applied thereto by the tensioning means 20.

Figure 2:
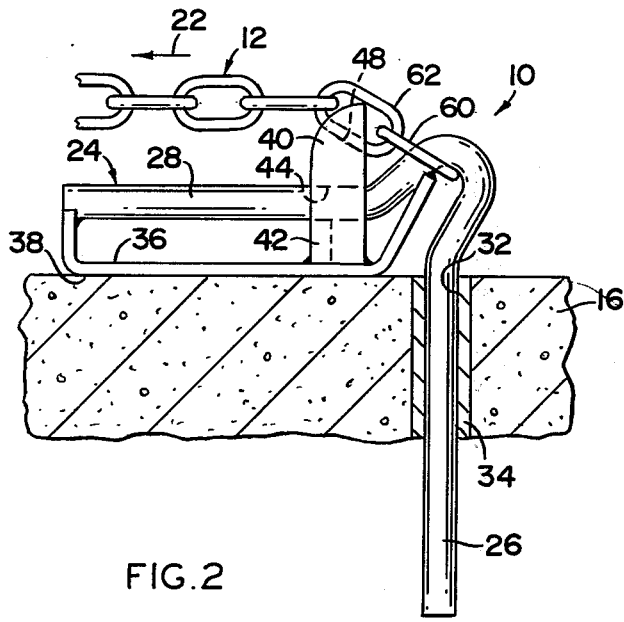
FIG. 2 is a fragmentary vertical section taken on line 2—2 of FIG. 1.
Figure 4:
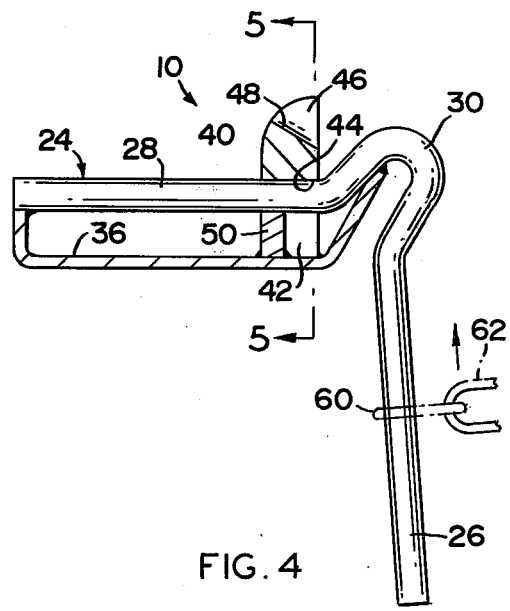
FIG. 4 is a vertical section taken on line 4—4 of FIG. 3.

The hold down anchor 10 includes or comprises a metal rod 24 that has two straight arm sections 26 and 28 provided thereon, which arm sections normally form an angle of about 90° and are secured together by a curved portion which may be of substantially U-shape, as indicated at 30 in the drawings. FIG. 2 best shows that one arm section 26 normally extends vertically downwardly and is adapted to be received in a hole 32 in the floor, and the hole may have a guide bushing or reenforcing sleeve 34 positioned therein. Preferably the arm section is snugly received in this hole and it has an exposed upper portion including the second arm section 28 that normally has a reenforcing means such as a plate or bar member 36 secured to it, as by welding, at spaced portions thereof. Such plate means or member 36 has a flat lower surface at 38 so it will bear on the floor for effective reenforcing engagement therebetween.

To aid in securing a chain to the hold down anchor, a device such as a support block 40 normally is secured to and extends upwardly from this second arm section 28. Such support block preferably is bifurcated on both its upper and lower end portions so that its lower end 42 has a slot 44 therein that normally will fit over the arm section 28 and extend down to the support means to be secured, as by welding thereto. The upper end of the support block likewise has a slot 46 therein, which slot has a base surface 48 provided thereon that extends upwardly and outwardly with relation to the downwardly extending arm section 26. The arm section and support block 40 may be reenforced as by an insert block 50 positioned between the arm section 28 and the support plate 36 and welded in position to prevent downward flexure of the support arm section. The drawings indicate that a link 60, for example, usually an end link, of the chain 12 can be threaded into engagement with the arm section 26 and then normally the second link 62 of this chain is snugly received in the upper portion of the support block in the slot 46 thereon to bear against the inclined base surface 48. The remaining links in this chain 12 extend from the anchor device of the invention at an acute angle to the horizontal for attachment to the load means, such as the vehicle 18.

From the foregoing, it will be seen that this hold down anchor device of the invention is made from a minimum number of members, such as three or four, and that these members all can be made from sturdy metal means. The members normally would all be welded together and be made from materials of suitable sizes to provide strengths requisite for the jobs for which the anchor device is to be used.

The hold down device of the invention is particularly suitable for attaching a flexible means to an anchor device wherein the anchor device normally would be engaged with a support surface and the tensioning means, cable, or chain would extend from at least one portion of the anchor device at a small acute angle in relation to an associated arm portion of the anchor device. Naturally, the anchor means can be made from metal rod of any suitable size, and support sockets provided for receiving one arm or leg portion of the hold down device can be suitably reenforced for maximum strength and load application thereto.

The unit 10 can be grasped manually, quite readily, when the anchor unit is in its operative position. The unit is of such size that one can grasp the horizontal arm section 28 by hand. One's fingers or knuckles are protected by the plate 36 and the unit can be turned around its vertical leg 26 while pulling up.

The unit of the invention is sturdy, relatively uncomplicated, and is easy to assemble in operative position or to disassemble therefrom. The anchor normally would be removably positioned in engagement with the hole in the floor 16 and even in use, it does not provide any massive apparatus that would get in the way of the workmen occupying the areas at which the hold down anchors are positioned. The floor's flat support surface is available for normal use as soon as the anchor is removed. Thus, it is believed that the objects of the invention have been achieved.

While one complete embodiment of the invention has been disclosed herein, it will be appreciated that modification of this particular embodiment of the invention may be resorted to without departing from the scope of the invention.

What is claimed is:
1. In combination,
a chain and a hold down anchor for the chain and comprising a substantially L-shaped metal bar one arm of which is adapted to be positioned in a hole in a floor, a support block secured to the second arm of said metal bar and extending upwardly therefrom, the upper end of said support block being bifurcated and having a surface inclined upwardly and away from said metal bar first arm, said chain having one link engaging said metal bar and having a link bearing on said support block surface for load transmittal to said metal bar and support block, the other end of said chain extending to another area for attachment to a load.

2. In a combination, as in claim 1, a reenforcing means secured to and dependent from a second arm of said metal bar, which reenforcing means engages and supports said support block and which reenforcing means is adapted to seat on a support surface.

3. A hold down anchor for engaging a support for a chain or the like comprising
a metal rod including two straight arm sections forming an angle of about 90°, one of said arm sections being adapted to be received in a socket hole in the floor or support,
a reenforcing plate means secured to said second arm section at spaced portions thereof and dependent therefrom to rest on the floor or support when in use,
a vertically extending support block having bifurcated top and bottom portions and with the bottom portion positioned over said second arm section and extending down to and engaging and supported by said plate means and
the top portion of said support block being recessed to engage a link of a chain another portion of which engages said metal rod whereby the chain can extend from said support block to a load but with the chain being adapted to be anchored by said one arm section of said rod.

4. A hold down anchor as in claim 3 where said recess in said support block has a base surface extending upwardly and outwardly from said one arm section and where a said chain link fits between the spaced ends of the bifurcated top portion of said support block.

5. A hold down anchor for engaging a support for a chain or the like as in claim 3 where a reenforcing member is secured between said second arm section and said plate means.

* * * * *